United States Patent [19]

Rutledge

[11] 3,860,642

[45] Jan. 14, 1975

[54] METAL-CHELATE CATALYZED OXIDATION OF MONOSACCHARIDES AND DERIVATIVES THEREOF

[75] Inventor: Thomas F. Rutledge, Wilmington, Del.

[73] Assignee: ICI America Inc., Wilmington, Del.

[22] Filed: Dec. 4, 1972

[21] Appl. No.: 311,495

[52] U.S. Cl................................. 260/528, 252/193
[51] Int. Cl....................... C07c 51/26, C07c 51/27
[58] Field of Search......................... 260/528, 531 C

[56] References Cited
OTHER PUBLICATIONS

Kamiya, C.A., 72:11793y, (1970)
Singh et al., "J. Am. Chem. Soc." (1970) 92 (3) pp. 537–41
Meenakshi et al., "J. of Catalysis," 19, (1970) pp. 300–309
Bekoroglu et al., "C.A." (1965), Vol. 62, 4897.

Primary Examiner—James A. Patten
Assistant Examiner—Michael Shippen

[57] ABSTRACT

A compound selected from the group consisting of monosaccharides containing at least 4 carbon atoms, polyhydric alcohol derivatives of these monosaccharides, and polyhydric acid derivatives of these monosaccharides is oxidized by contacting an aqueous solution of the compound, in the presence of an alkaline material and a catalyst selected from the group consisting of copper glycinate, copper acetylacetonate, copper phthalocyanine disulfonate, copper phthalocyanine, copper glutamate, copper diethylene tetramine pentaacetate, cobalt glutamate, cobalt acetylacetonate, cobalt trisodium diethylene tetramine pentaacetate, and cobalt disodium ethylene diamine tetraacetate, with oxygen or an oxygen-containing gas.

9 Claims, No Drawings

3,860,642

METAL-CHELATE CATALYZED OXIDATION OF MONOSACCHARIDES AND DERIVATIVES THEREOF

BACKGROUND OF THE INVENTION

Field of the Invention

The present invention relates generally to the use of a specific group of metal-chelate compounds as catalysts in the oxidation of certain monosaccharides and monosaccharide derivatives. More particularly, the present invention relates to the use of a catalyst selected from the group consisting of copper glycinate, copper acetylacetonate, copper phthalocyanine disulfonate, copper phthalocyanine, copper glutamate, copper diethylene tetramine pentaacetate, cobalt glutamate, cobalt acetylacetonate, cobalt trisodium diethylene tetramine pentaacetate, and cobalt disodium ethylene diamine tetraacetate to accelerate the oxidation of a compound selected from the group consisting of monosaccharides containing at least 4 carbon atoms, polyhydric alcohol derivatives of said monosaccharides, and polyhydric acid derivatives of said monosaccharides. The oxidation reaction is carried out by contacting an aqueous solution of the compound, containing an alkaline material and a suitable catalyst, with oxygen or an oxygen-containing gas.

DESCRIPTION OF THE PRIOR ART

A variety of compounds have previously been suggested for use as catalysts for oxidation reactions. Generally, with compounds such as the monosaccharides and derivatives thereof, the oxidation reaction is carried out employing a noble metal catalyst or a combination of catalysts including, as part of said combination, at least one noble metal catalyst.

As compared with the noble metal catalysts, the metal-chelates of the present invention are more economical. They are also not as easily poisoned or contaminated during the course of the reaction and they are, therefore, easier to reactivate and recycle.

In addition, the use of these metal-chelate catalysts eliminates the need for organic solvents frequently required in previous oxidation reactions. Such solvents are generally undesirable to work with on a commercial scale and it is, therefore, desirable to have an oxidation process which can be carried out employing aqueous solutions.

By the process of the present invention, it has been found that certain monosaccharides and monosaccharide derivatives can be oxidized in an aqueous solution by employing a metal chelate, selected from a group of cobalt and copper chelates, as a catalyst.

SUMMARY OF THE INVENTION

In accordance with the present invention, a compound, selected from the group consisting of monosaccharides containing at least 4 carbon atoms, polyhydric alcohol derivatives of said monosaccharides, and polyhydric acid derivatives of said monosaccharides, is oxidized by contacting an aqueous solution of the compound in the presence of an alkaline material and a catalyst selected from the group consisting of copper glycinate, copper acetylacetonate, copper phthalocyanine disulfonate, copper phthalocyanine, copper glutamate, copper diethylene tetramine pentaacetate, cobalt glutamate, cobalt acetylacetonate, cobalt trisodium diethylene tetramine pentaacetate, and cobalt disodium ethylene diamine tetraacetate, with oxygen or an oxygen-containing gas.

DESCRIPTION OF THE PREFERRED EMBODIMENTS

As described above, the present invention relates to the oxidation of monosaccharides and monosaccharide derivatives in which a metal-chelate compound is employed as a catalyst. The oxidation reaction is carried out by contacting an aqueous solution of the monosaccharide or derivative thereof, containing an alkaline material and a metal-chelate catalyst, with oxygen or an oxygen-containing gas.

The compounds which are oxidized in accordance with the present invention include monosaccharides and derivatives thereof including both polyhydric alcohols and polyhydric acids. The monosaccharides employed in the process of the present invention are those containing at least 4 carbon atoms. As used herein, the term monosaccharides includes both aldoses and ketoses. Representative aldoses — i.e., monosaccharides containing a terminal aldehyde (—CHO) group — which may be employed include, for example, glucose, arabinose and threose. Representative ketoses — i.e., monosaccharides containing a keto

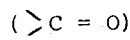

group — which may be employed include, for example, fructose and ribulose. The polyhydric alcohols which may be oxidized in accordance with the present invention are derivatives of monosaccharides containing at least 4 carbon atoms. These alcohols, which may be prepared by reducing the corresponding monosaccharide, include compounds such as sorbitol and mannitol. The final class of compounds which may be oxidized in accordance with the present invention are the polyhydric acid derivatives of monosaccharides containing at least 4 carbon atoms. These materials include, for example, compounds such as gluconic acid and mucic acid which may be prepared by oxidizing the corresponding monosaccharide.

Catalysts which may be employed to accelerate the oxidation of the above-identified compounds have been found to include a group of cobalt and copper chelates. As used herein, the terms cobalt and copper refer to the cobaltous and cupric materials, respectively. Specific cobalt chelates which may be employed include cobalt glutamate, cobalt acetylacetonate, cobalt trisodium diethylene tetramine pentaacetate, and cobalt disodium ethylene diamine tetraacetate. Copper catalysts which may be employed include copper glycinate, copper acetylacetonate, copper phthalocyanine disulfonate, copper phthalocyanine, copper glutamate and copper diethylene tetramine pentaacetate. Of the above-mentioned catalysts, preferred results have been achieved with the copper chelates.

The amount of catalyst employed may be varied over a wide range. However, preferred results have been achieved with an amount of chelate catalyst in the range of from about 2% to about 7% by weight, based on the weight of the material to be oxidized. Especially preferred results have been achieved with an amount of catalyst equal to from about 3% to about 6% by weight based on the weight of the material being oxidized.

The oxidation reaction of the present invention is carried out by first dissolving the monosaccharide or monosaccharide derivative in water. To the resulting solution there is then added the appropriate amount of catalyst as described above. It is also possible, in accordance with the present invention, to employ a combination of two or more of the above-mentioned catalysts.

In carrying out the oxidation reaction, there is also added to the aqueous solution of the monosaccharide or derivative thereof an alkaline material. The alkaline materials which may be employed have not been found to be critical to the oxidation reaction of the present invention. In general, any material which is soluble in water; produces an aqueous solution having a basic pH — i.e., above about 7; and does not interfere with the reaction may be utilized. Representative alkaline materials which may be employed include, for example, sodium bicarbonate, sodium hydroxide, and the like. The amount of alkaline material employed should be sufficient to convert the acidic materials formed during the oxidation reaction to their salt form. In determining the total amount of alkaline material to be utilized, it has been found that, when oxygen gas is employed, an amount equal to 2 equivalents of alkaline material for each mol of oxygen consumed during the course of the reaction is sufficient. Alternatively, the amount of alkaline material can be determined by monitoring the pH during the course of the reaction and, by the addition of an appropriate amount of alkaline material, maintaining the pH in the range of from about 6 to about 9. A still further method of determining the amount of alkaline material to be utilized is to monitor the rate at which the monosaccharide, or derivatives thereof, is utilized during the course of the reaction and the nature and amount of oxidized derivatives produced and, based on these calculations, add the alkaline material at a rate sufficient to neutralize the oxidized derivatives as they are produced.

Although it is not essential to the operability of the process, it is preferred to add a portion of the stoichiometric amount of alkaline material which would be required to neutralize all of the acidic products resulting during the course of the reaction to the solution prior to the introduction of oxygen and to continue the addition of base during the course of the reaction at a rate which is sufficient to neutralize the acidic materials as they are formed. It has not, however, been found to be critical to the operability of the present invention to at all times during the course of the reaction have an excess of alkaline material present in the reaction mixture. However, as the pH of that mixture is lowered, the rate of reaction decreases and it is, therefore, not desirable in a practical, commercial system to allow the pH of the reaction mixture to become so low that the rate of reaction is greatly reduced. On the other hand, it has been found that, if the pH is raised, there is a tendency to both cleave and oxidize the starting materials and produce acids containing less than the number of carbon atoms in the monosaccharide or derivative thereof employed in the reaction mixture. Thus, if it is desired to produce a cleaved and oxidized product, more alkaline material should be added to the reaction mixture both initially and during the course of the reaction than would be desirable if the uncleaved products are being produced.

As mentioned above, the products produced in accordance with the process of the present invention can be varied over a wide range depending upon the starting material and the reaction conditions employed, the latter including reaction time, temperature, amount of catalyst, and pH. It is possible, in accordance with the present invention, to produce oxidized derivatives having the same number of carbon atoms as the starting material or, to both cleave and oxidize the starting material, to produce oxidized derivatives having a lower number of carbon atoms than present in the starting material. Thus, if glucose is oxidized, it is possible to produce either gluconic acid or tartaric acid.

The reaction temperature employed may be varied from room temperature — i.e., the temperature of the solution without the use of external heat or cooling, up to about 90°C. No further advantage has been noted in running the reaction much above 90°C. since at temperatures in this range the boiling point of the water employed is approached and any advantages gained are, on a practical basis, offset by the problems encountered. Although an increase in the reaction temperature also increases the rate of the oxidation reaction, it has been found that, at higher temperatures, the tendency to cleave the starting material is also increased. Thus, if it is desirable to produce cleaved as well as oxidized products, the reaction should be run at a higher temperature. A combination of a high temperature and an increased amount of alkaline material is generally sufficient to assure that the products produced contain a lower number of carbon atoms than the starting materials.

The oxidation reaction is carried out by allowing the reaction mixture to stir for a suitable period of time in an air atmosphere or, alternatively, by introducing air, oxygen or another oxygen-containing gas into the reaction mixture. To assure that there is an adequate supply of oxygen present during the course of the reaction, it is preferred to introduce oxygen continuously during the reaction or to monitor the reaction to determine that oxygen is available.

Oxidation products produced in accordance with the present invention are useful as sequestrants, concrete and mortar additives, in alkaline bottle washing formulations, and in alkaline derusting and aluminum etching baths.

In order to describe the present invention so that it may be more clearly understood, the following examples are set forth. These examples are set forth primarily for the purpose of illustration and any enumeration of detail contained therein should not be interpreted as a limitation on the concept of the present invention.

In the examples, the effectiveness of the oxidation products as sequestrants was determined by measuring the calcium ion sequestering index of the materials in accordance with the procedure described by Mehltretter et al. in 45 *Industrial and Engineering Chemistry* 2782 (1953). In this procedure, sodium gluconate, which is commonly employed as a sequestering agent, is assigned an index of 1.0.

EXAMPLE I

Into a creased flask equipped with a high-speed, shearing-action stirrer, there was added 27 grams (150 millimoles) of glucose dissolved in 220 cc. of water, 1.5 grams of copper phthalocyanine and 12.6 grams (150 millimoles) of sodium bicarbonate. The resulting reaction mixture was stirred and heated to a temperature of 70°C. for 2½ hours during which time air was introduced into the reaction mixture. At the end of this time, 30% of the glucose had been oxidized to a material having a calcium ion sequestering index of 0.95.

EXAMPLE II

The catalyst employed in Example I was recovered at the end of the oxidation reaction by filtering the reaction mixture and was washed with water. The recovered catalyst was combined, as in Example I, with 27 grams of glucose, 220 cc. of water and 16.8 grams of sodium bicarbonate. The resulting reaction mixture was heated in the presence of air at a temperature of 50°C. for 8 hours at the end of which time 60% of the glucose had been oxidized to a product having a calcium ion sequestering index of 0.87.

The catalyst was again recovered and used in a third reaction with similar results. At the end of this reaction, the catalyst was again recovered and combined, as in Example I, with 27 grams of glucose in 220 cc. of water and 12.6 grams of sodium bicarbonate. The resulting reaction mixture was heated in the presence of air at a temperature of 80°C. for 3½ hours at the end of which time 76% of the glucose had been oxidized to a product having a calcium ion sequestering index of 0.74.

EXAMPLE III

Several samples of glucose were prepared by dissolving 2.7 grams (15 millimoles) of glucose in 10 cc. of water. To each of these samples, there was then added one of the catalysts indicated in Table 1. The resulting reaction mixture was heated to 70°C. and oxygen gas was introduced from a gas buret. The amount of oxygen utilized and the reaction time for each sample are also given in Table 1. An aqueous solution of sodium hydroxide was also introduced into the reaction mixture during the course of the reaction. The total amount of sodium hydroxide employed is also indicated in Table 1. The sodium hydroxide was added so that the ratio of mols of alkaline material added to mols of oxygen consumed was equal to about 2.0. As can be seen from the data in Table 1, all of the catalysts employed accelerated the oxidation reaction.

TABLE 1

| Catalyst Compound | Amount (grams) | Reaction Time (Hours) | O₂ Used (mmoles) | Total NaOH (mmoles) |
| --- | --- | --- | --- | --- |
| None | | 5 | 8.6 | 14.90 |
| A | 0.15 | 4¼ | 12.95 | 22.70 |
| B | 0.15 | 2⅔ | 7.14 | 12.53 |
| C | 0.174 | 5 | 11.9 | 22.30 |
| D | 0.15 | 4½ | 13.0 | 23.48 |
| E | 0.15 | 5 | 13.1 | 24.90 |
| F | 0.15 | 2¼ | 10.7 | 18.75 |
| G | 0.15 | 1⅓ | 13.3 | 24.60 |

A - copper phthalocyanine
B - copper phthalocyanine disulfonate
C - cobalt diethylene tetramine pentaacetate
D - cobalt glutamate
E - cobalt acetylacetonate
F - copper acetylacetonate
G - copper glycinate

EXAMPLE IV

Several monosaccharides and monosaccharide derivatives were oxidized in accordance with the present invention by dissolving 15 millimoles of each of the materials listed in Table 2 in 10 cc. of water. To each of the solutions, there was then added 0.15 grams of copper glycinate. The resulting reaction mixture was heated to 70°C. and oxygen gas and an aqueous sodium hydroxide solution were added as in Example III.

As can be seen from the data in Table 2, all of these materials can be readily oxidized in accordance with the present invention.

TABLE 2

| Compound | Amount | Reaction Time (Hours) | O₂ Used (mmoles) | Total NaOH (mmoles) |
| --- | --- | --- | --- | --- |
| Arabinose | 2.25 g. | 1¾ | 12.5 | 19.55 |
| Levulose | 2.71 g. | 2 | 13.8 | 19.5 |
| Sodium gluconate | 3.27 g. | 3½ | 10.6 | 13.6 |
| Sorbitol | 2.73 g. | 5 | 13.1 | 15.3 |

What is claimed is:

1. A method of oxidizing a compound selected from the group consisting of monosaccharides containing at least 4 carbon atoms, polyhydric alcohol derivatives of said monosaccharides and polyhydric acid derivatives of said monosaccharides, said method comprising contacting an aqeuous solution of the compound, the temperature of the solution being equal to from room temperature to about 90°C., with oxygen or an oxygen containing gas, an alkaline material in an amount sufficient to maintain the pH of the solution in the range of from about 6 to about 9, and a catalyst selected from the group consisting of copper glycinate, copper acetylacetonate, copper phthalocyanine disulfonate, copper phthalocyanine, copper glutamate, copper diethylene tetramine pentaacetate, cobalt glutamate, cobalt acetylacetonate, cobalt trisodium diethylene tetramine pentaacetate and cobalt disodium ethylene diamine tetraacetate wherein the terms copper and cobalt refer to the cobaltous and cupric materials.

2. A method, as claimed in claim 1, wherein the compound is a monosaccharide.

3. A method, as claimed in claim 2, wherein the monosaccharide is glucose.

4. A method, as claimed in claim 1, wherein the catalyst is selected from the group consisting of copper glycinate, copper acetylacetonate, copper phthalocyanine disulfonate, copper phthalocyanine, copper glutamate and copper diethylene tetramine pentaacetate.

5. A method, as claimed in claim 4, wherein the catalyst is copper glycinate.

6. A method, as claimed in claim 1, wherein the amount of catalyst is equal to from about 2% to about 7% by weight based on the weight of the compound employed.

7. A method, as claimed in claim 6, wherein the amount of catalyst is equal to from about 3% to about 6% by weight based on the weight of the compound employed.

8. A method, as claimed in claim 1, wherein an oxygen-containing gas is employed.

9. A method, as claimed in claim 8, wherein the oxygen-containing gas is air.

* * * * *